Figure 1:
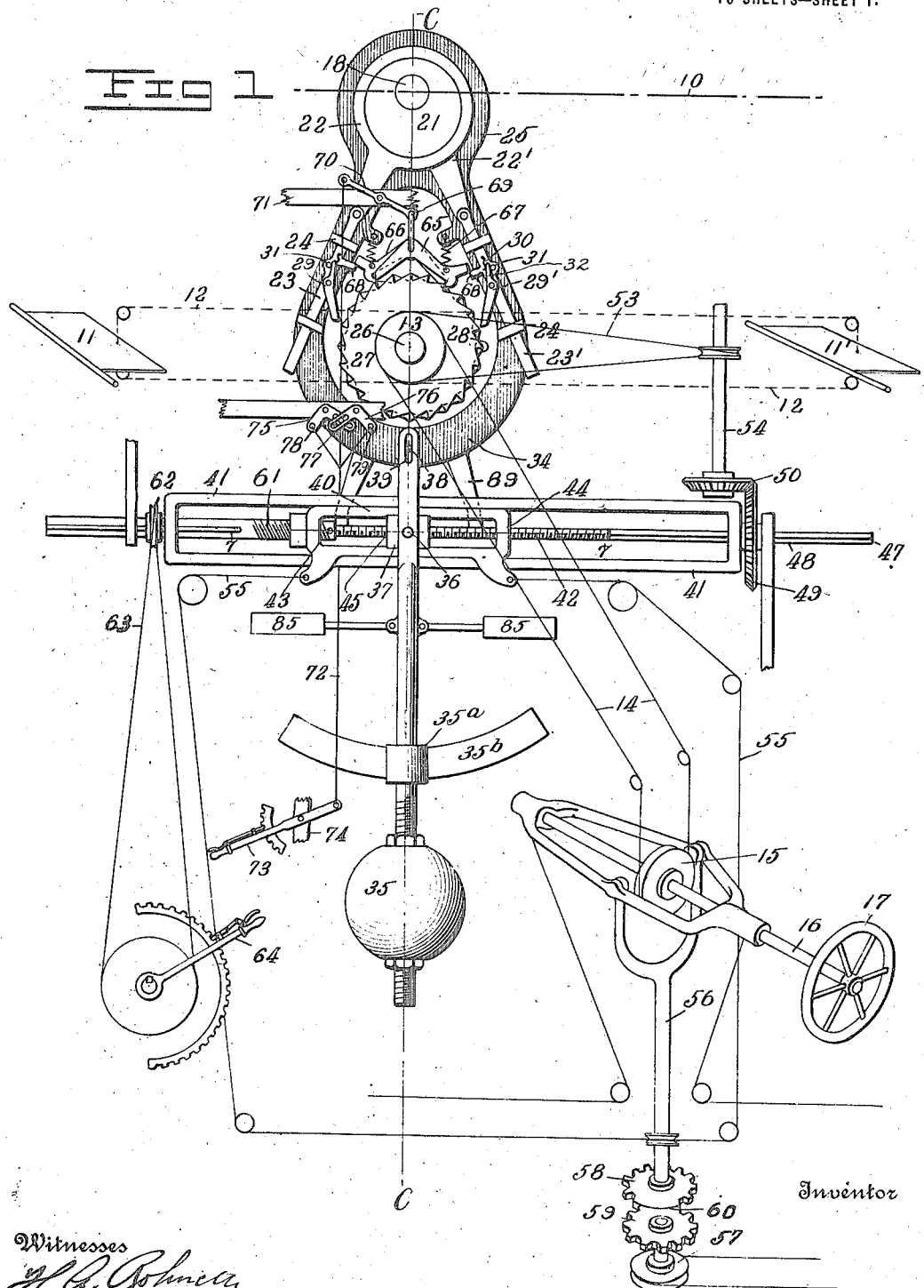

J. P. TARBOX.
AUTOMATIC BALANCING MECHANISM FOR AIRCRAFT.
APPLICATION FILED FEB. 10, 1911.

1,180,272.  Patented Apr. 18, 1916.
10 SHEETS—SHEET 1.

Witnesses
H. A. Rohner
H. P. Hollingsworth

Inventor
John P. Tarbox

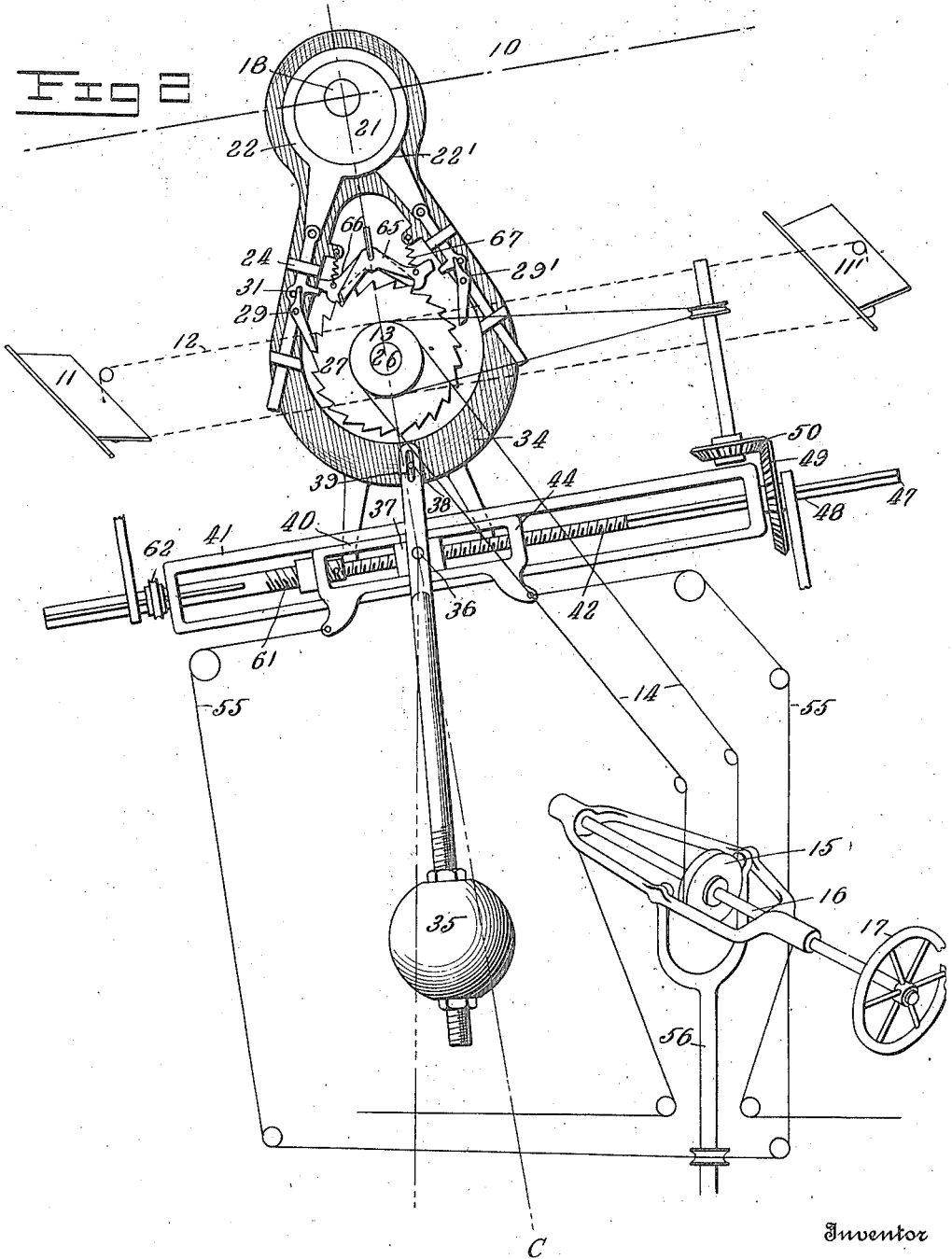

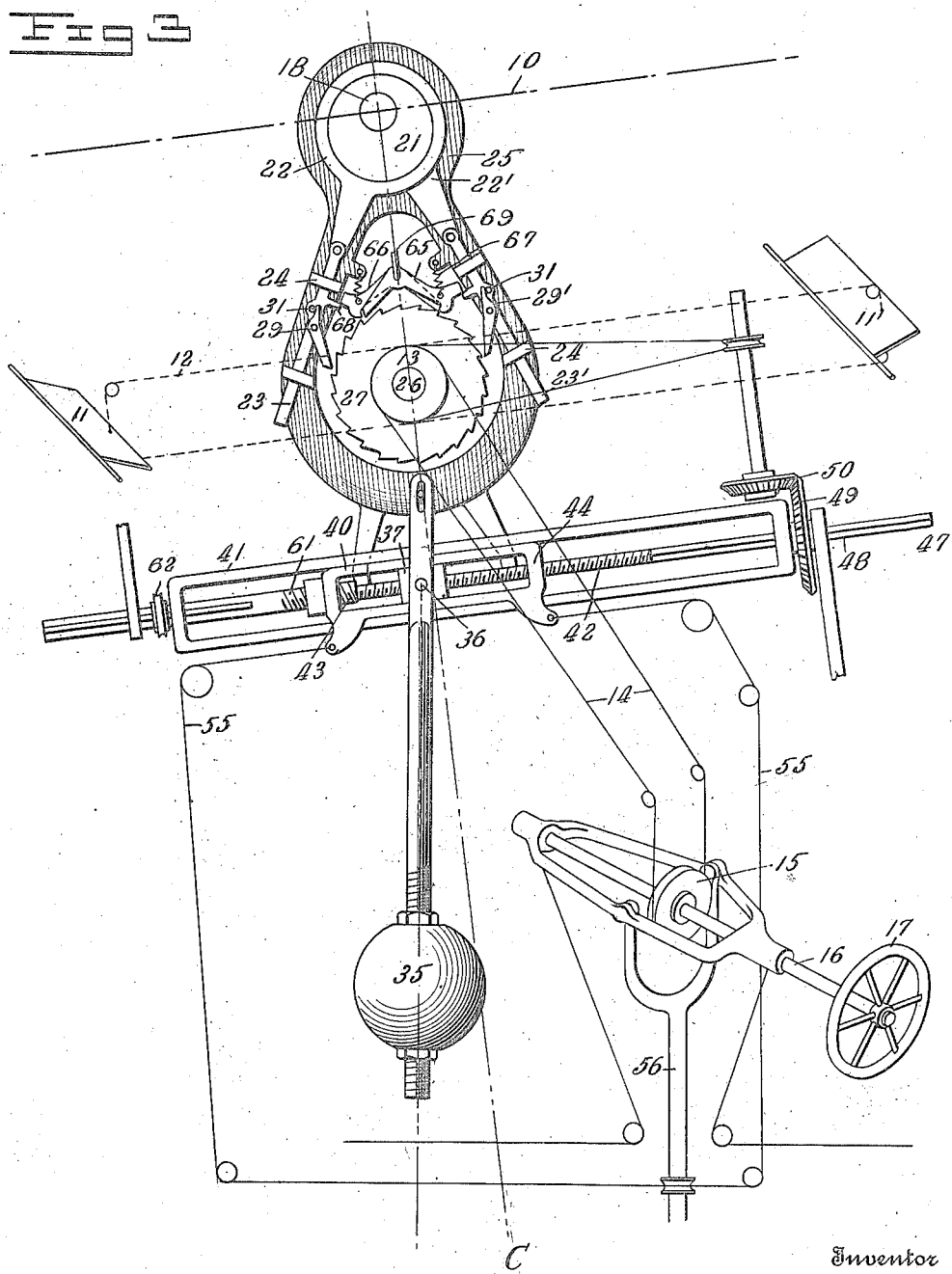

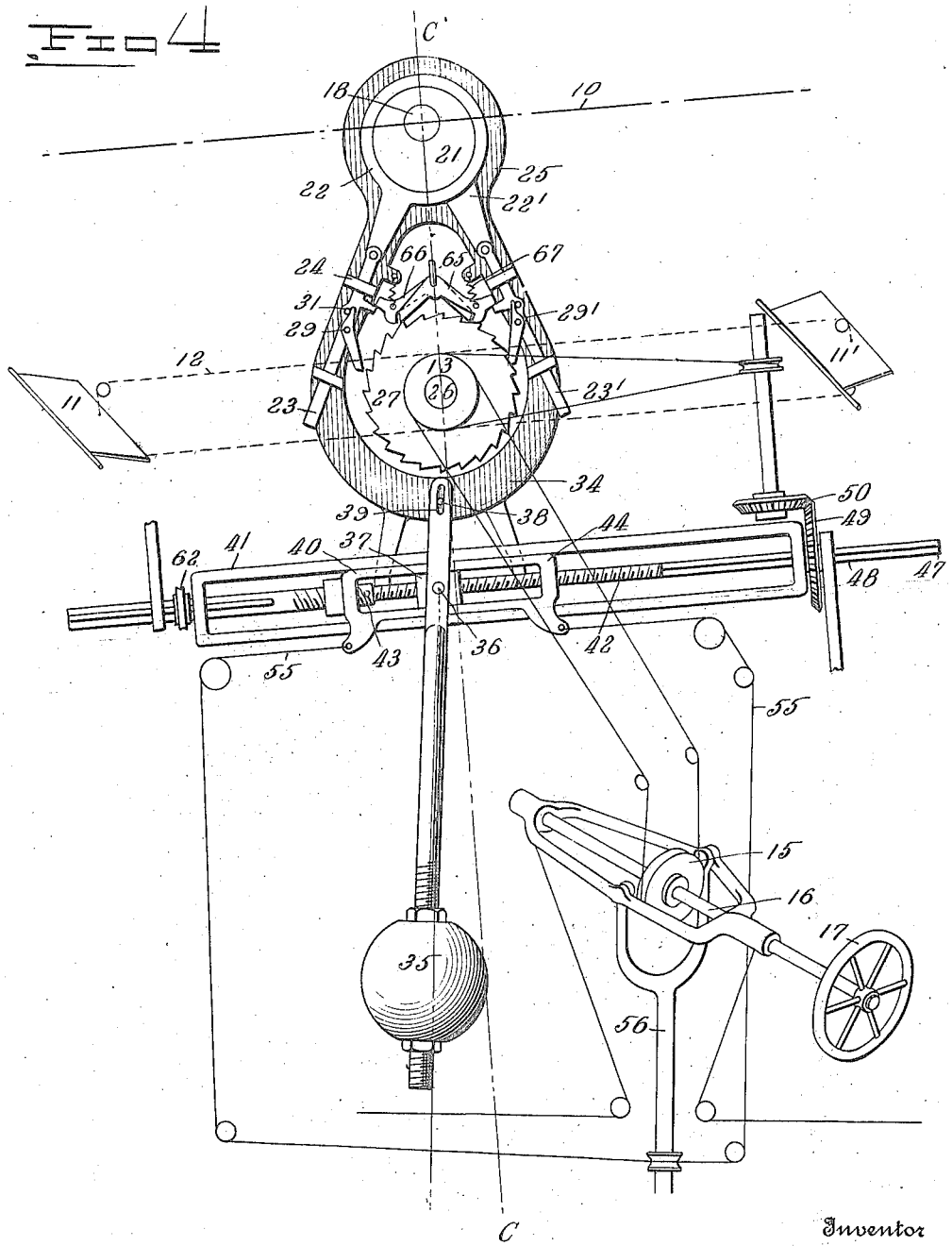

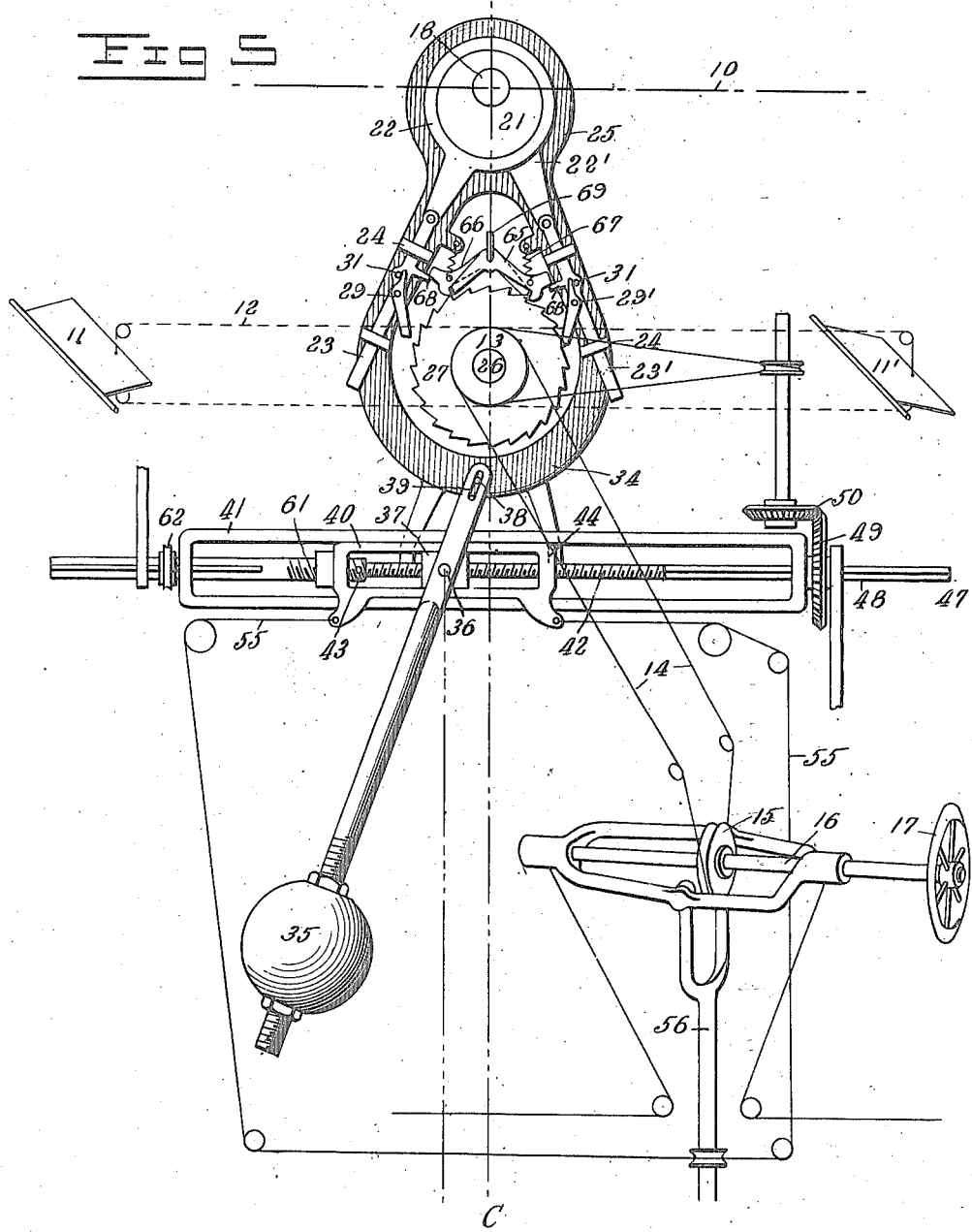

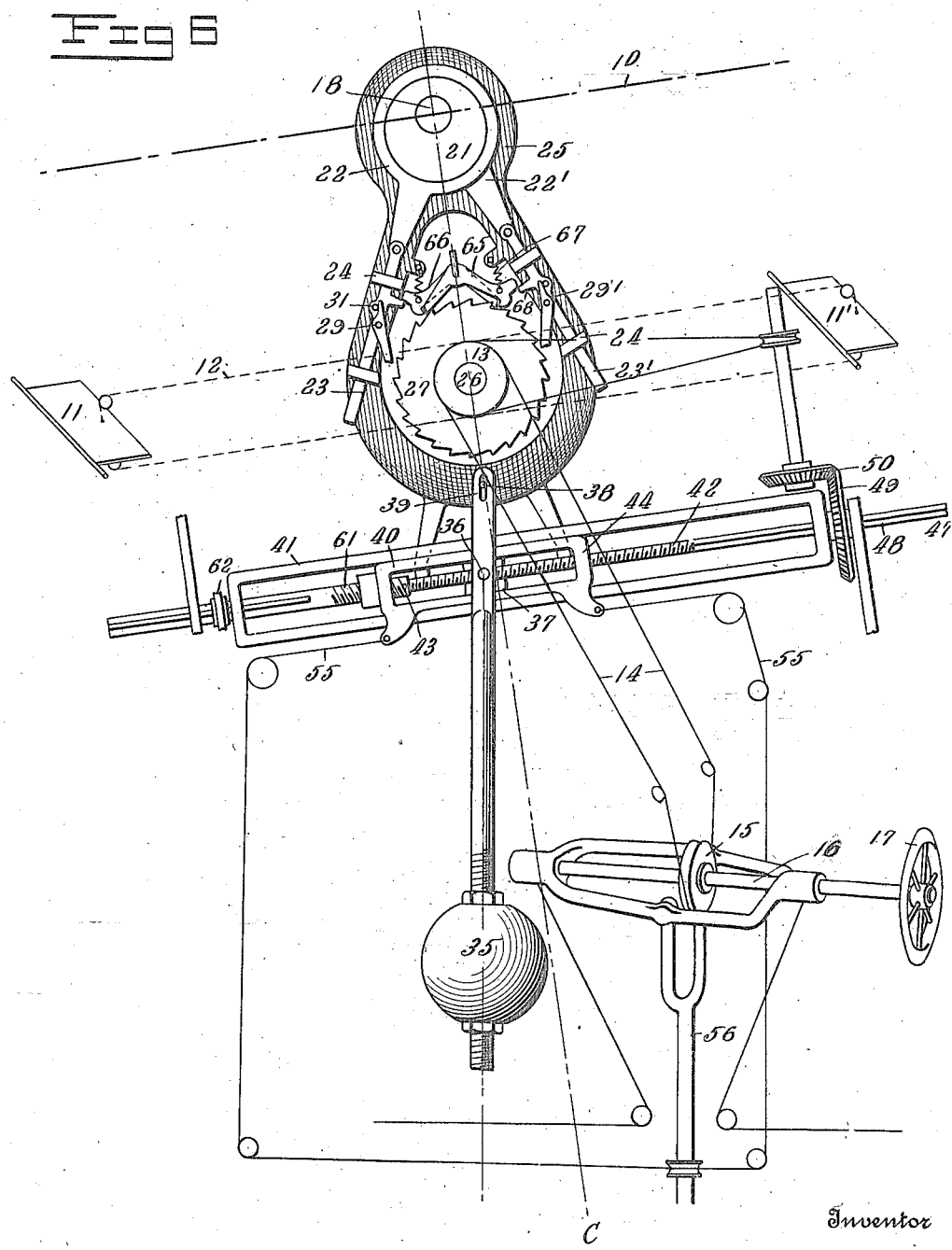

J. P. TARBOX.
AUTOMATIC BALANCING MECHANISM FOR AIRCRAFT.
APPLICATION FILED FEB. 10, 1911.

1,180,272.

Patented Apr. 18, 1916.
10 SHEETS—SHEET 7.

Witnesses

Inventor
John P. Tarbox

J. P. TARBOX.
AUTOMATIC BALANCING MECHANISM FOR AIRCRAFT.
APPLICATION FILED FEB. 10, 1911.
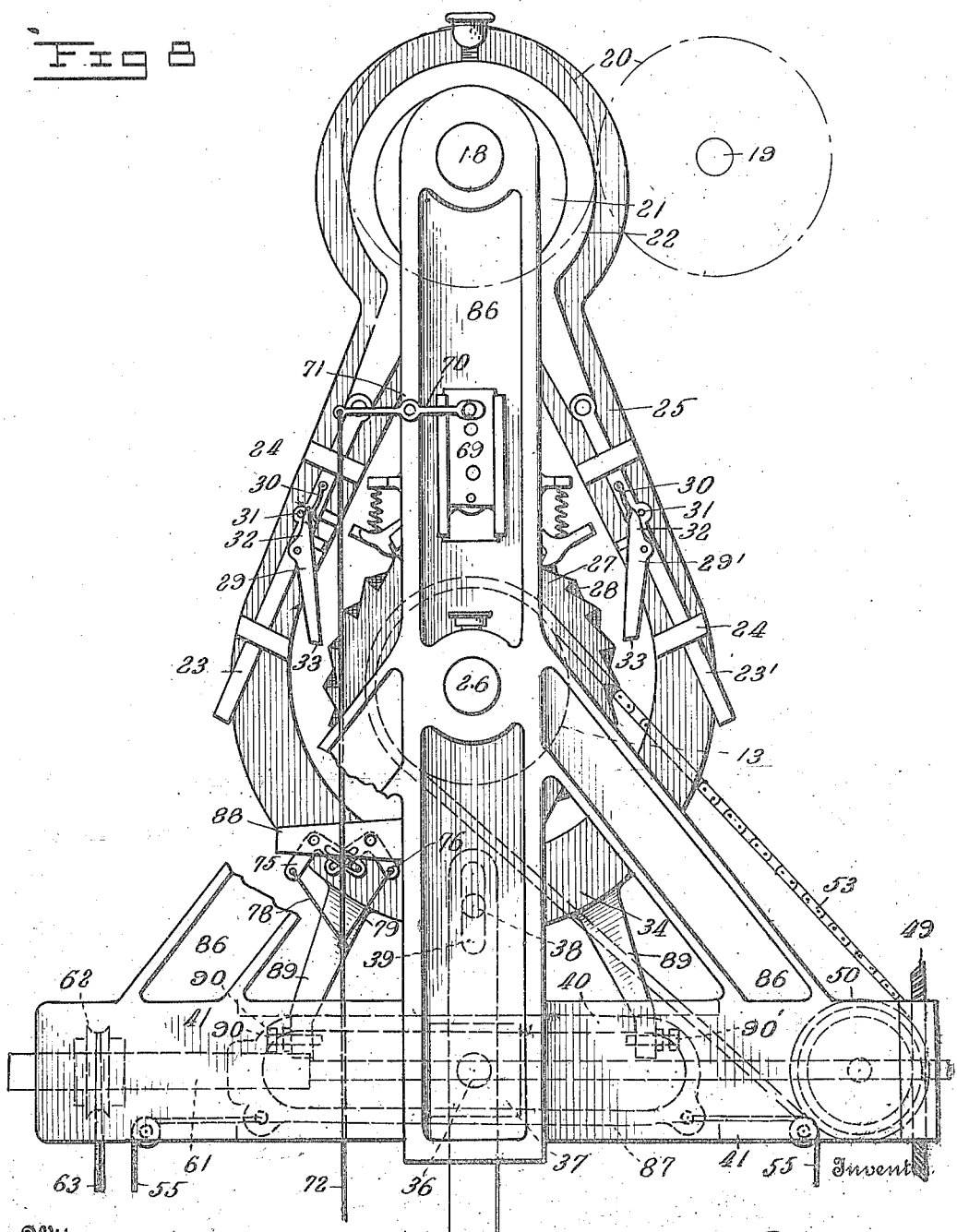

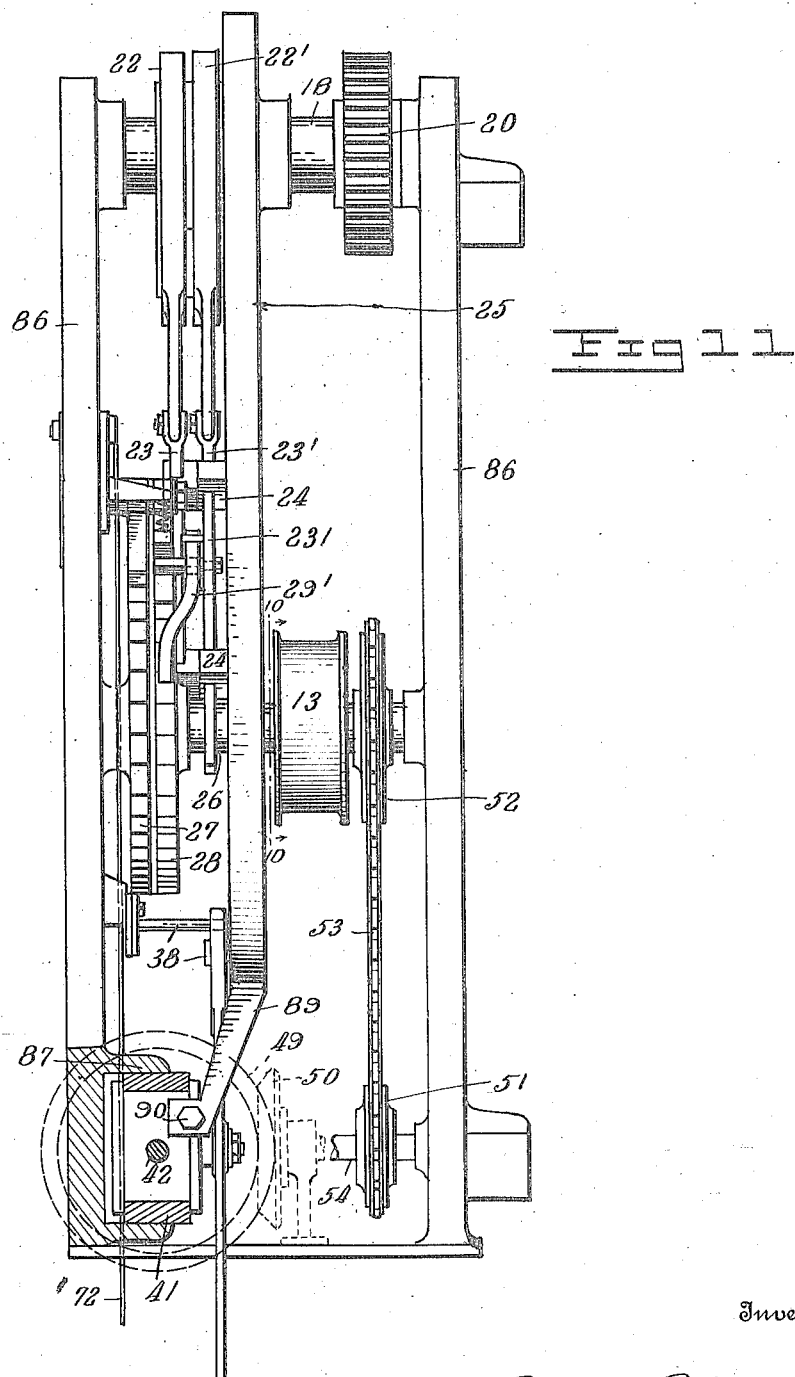

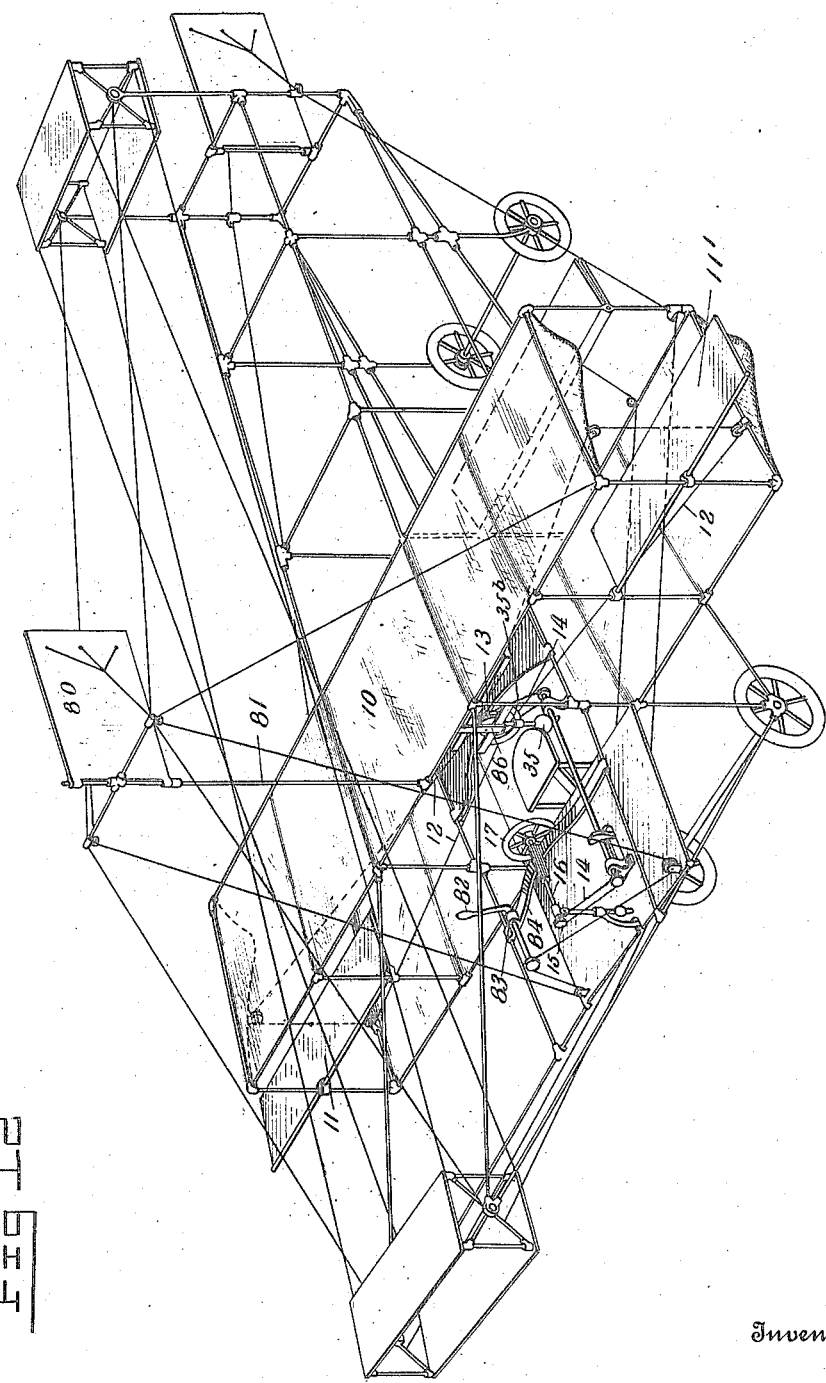

UNITED STATES PATENT OFFICE.

JOHN P. TARBOX, OF WASHINGTON, DISTRICT OF COLUMBIA, ASSIGNOR TO TARBOX SAFETY AIRCRAFT COMPANY, A CORPORATION OF DELAWARE.

AUTOMATIC BALANCING MECHANISM FOR AIRCRAFT.

1,180,272.　　　　Specification of Letters Patent.　　Patented Apr. 18, 1916.

Application filed February 10, 1911. Serial No. 607,736.

*To all whom it may concern:*

Be it known that I, JOHN P. TARBOX, a citizen of the United States, residing at Washington, in the District of Columbia, have invented new and useful Improvements in Automatic Balancing Mechanism for Aircraft, of which the following is a specification.

My invention consists of a mechanism which will automatically maintain the true balance of aerial craft and particularly that type of craft known as "flying machines". Not only will the mechanism automatically balance the craft while flying straight away, and when its balance is disturbed by varying air or craft conditions, but it will also automatically incline an air craft making a turn at an angle varying with the degree of the turn, and will maintain this angular inclination and balance the craft at that angle as long as the turn is being made, and will at the end of that time automatically right the machine and maintain the same righted until another turn is made. And this balancing is accomplished by the mechanism of my invention without in any way interfering with the full freedom of movement of the air craft, and its entire control by the operator. Hand control of the balancing means may be used if desired. The mechanism is organized in such form that it may be applied to any form of air craft whatsoever. In combination with any air craft in connection with which balancing means are used or may be used, the result is an automatically balancing craft.

The advantages of such a craft are very numerous, and most important as is now well recognized in the art. It is practically impossible for a novice to upset a craft laterally when the craft is provided with this invention. The mind of the operator is entirely relieved of responsibility of balancing, and accidents due to errors in judgment, and due to inability to respond quickly to unbalancing, are entirely avoided. Moreover the weight carried by the craft may be displaced laterally from the center of support, and carried there for long periods of time without upsetting the craft. It is possible to travel in winds which are rough and gusty without danger, and to travel in such winds moving at high velocity, an accomplishment which has not heretofore been possible.

In the accomplishment of my invention I make use of a standard of position with respect to the earth, and provide power operated mechanism which automatically maintains the craft in predetermined relation to this standard, the mechanism being controlled by change of positional relation between the standard and the craft. Further according to my invention I provide follow-up devices in connection with the mechanism which act to make the balancing dead beat and to secure a positive movement of the balancing means in all directions. Further I provide means for changing the normal relation between the standard and the craft at will, whereby the craft is maintained balanced at a different angle. Still the mechanism is so arranged that it may be used either in conjunction with hand control or either the mechanism or the hand control may be used independently.

I have shown in the accompanying drawings one of the specific forms which my invention may be given. In this embodiment I use as a standard of position with respect to the earth a pendulum. Any other standard may be substituted. The balancing means shown are a common form of balancing planes, hinged at the forward end of the craft and normally occupying a horizontal plane, and adapted to be moved in or out of that plane by its rear end. Any other form of balancing means may be used, such for instance as shown in my co-pending application Serial Number 607,735, filed February 10, 1911, or for instance as the warping planes of the Wright machines and others, or ailerons of the Farman type. The operating means for the balancing means is associated with a source of power which source is adapted to move the balancing means in response to change of positional relation between the craft and the standard. Controlling means are provided between the standard and the source of power by which the application of power to the operating means for the balancing devices is controlled. I have shown a winding drum operating the balancing devices through cords. Any known operating means may be used. I have also shown the source of power as a continuously rotated shaft driven from the engine of the air craft. Any other suitable source of power may likewise be used. The steering mechanism associated with the balancing mechanism is of the form shown in my copending application Serial Number 607,735, filed February 10, 1911. Any other form of steering mechanism may be used. Similarly the other parts of my invention may be given other forms—as I shall show.

Thus broadly is my invention defined, and specifically it consists in the details of the embodiment disclosed herein and in the details of other embodiments the subjects matter of which are to be incorporated in divisional applications.

Figure 9:
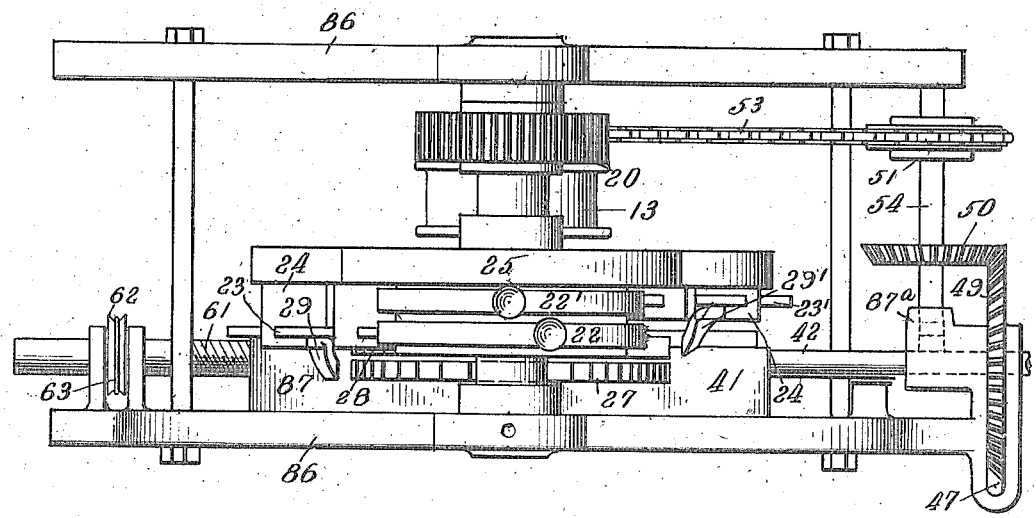
Figure 7:
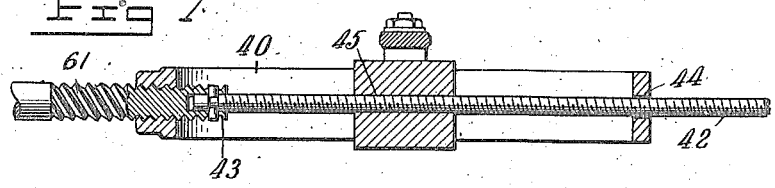
Figure 10:
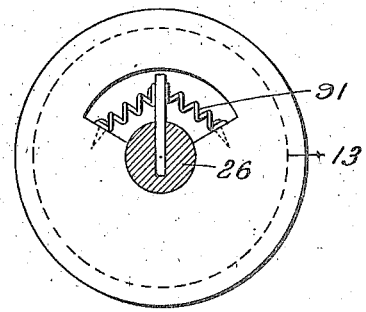

Figures 1 to 6 are diagrammatic—Fig. 1 shows the parts in normal position with the craft balanced horizontally. Fig. 2 shows the parts in the positions they occupy immediately upon a list to the left, and before the balancing devices have been operated. Fig. 3 shows the parts in the positions they occupy after the balancing devices have been operated to their maximum position and the craft recovering its normal position. Fig. 4 shows the positions of the parts with the craft more fully recovered and with the balancing devices being moved back from maximum position to normal. Fig. 5 shows the positions of the parts as changed through the steering gear in making a turn. Fig. 6 shows the parts in their positions during the making of a turn with the steering rudder in a defined position, the craft being in a state of balance. Fig. 7 is a detail section on line 7—7 of Fig. 1. Fig. 8 is a front elevation of a commercially organized mechanism ready for use. Fig. 9 is a plan view of the same. Fig. 10 is a central vertical section of the operating means on line 10—10 of Fig. 8. Fig. 11 is a side elevation. Fig. 12 is a view of the mechanism installed in a machine.

Referring to the drawings 10 designates the main planes of a flying machine of the biplane type diagrammatically, and 11 and 11′ designate the right and left balancing planes. These balancing planes are controlled by cords or wires 12 which extend to a drum 13 to which they are secured and by which they may be operated. This constitutes the operating means. Cords 14 extend from this drum to drum or pulley 15 on the control shaft 16 of the steering mechanism. By turning this shaft 16 by means of the hand wheel 17 the balancing means may be moved manually in the usual manner when the automatic mechanism is not in operation. This is the manual hand control.

18 is a shaft rotated continuously by the engine shaft 19 through gears 20. Eccentrics 21 and 21′ act through straps 22 and 22′ to reciprocate rods 23 and 23′ held in bearings 24 in the power controlling frame 25 pivotally supported on shaft 18. The eccentrics with the shaft constitute the source of power. The drum 13 is mounted on shaft 26 parallel to and below shaft 18, preferably vertically below. The controlling frame 25 is open between the rods 23 and 23′, the legs of the frame straddling the shaft 26. Between them and keyed to the shaft 26 are two disks 27 and 28 which are provided with oppositely disposed ratchet teeth. The dimensions of the parts are such that normally when the frame 25 hangs vertically downward, both of the rods 23 23′ are spaced away from the respective disks 27 28 so that these disks may turn free with the shaft. Operating pawls 29 29′ secured to the rods 23 and 23′ are adapted to engage the respective disks 27 and 28 when the frame 25 is moved to one side or the other. These pawls are biased inwardly toward the disks by springs 30 but are prevented from normally engaging the disks by retaining pins 31 which engage the extensions 32 from the rear ends of the pawls and limit the inward movement of the front ends 33.

A yoke 34 connects the legs of the frame below the shaft 26. The pendulum 35 mounted vertically below the shafts 18 and 26 is pivoted at 36 to a sliding block 37. Its upper end is extended and is connected to the yoke 34 by a pin and slot connection 38 39. The block 37 is movable laterally in a frame 40 which frame is in turn laterally movable in guides 41. A screw 42 is journaled in bearings 43 44 on frame 40 and has a threaded connection 45 with block 37. The pendulum is the standard of position. One end of the screw 42 is provided with an extension shaft 47 having a key way 48 through which a sliding geared connection is made with beveled gear 49. A second beveled gear 50 meshes with the gear 49 and is driven from shaft 26, partaking of the movements thereof through sprockets 51 52 chain 53 and shaft 54. Thus block 37 to which the pendulum is connected is given a movement proportional to the movement of the shaft 26. This mechanism is the follow-up device.

The frame 40 is connected by means of cords 55 with the rotatable steering post 56 of the steering mechanism. By the rotation of this post the vertical rudders are turned to change the lateral direction of the craft. This post is geared to controlling drum 57 of the rear rudder by means of a lost motion gear connection 58 59. The teeth of the gear 58 are removed for some distance, while the teeth of the gear 59 are removed only for a distance sufficient to make room for the arcuate cut 60 by which the gear 59 is normally locked by the gear 58. Thus a lost motion connection is provided between the shaft 56 and the vertical rudder. Thus means is provided for causing a change of the relative position of the standard 35 and power controlling means upon operation of the steering gear.

The left hand end of the frame 40 carries a laterally movable bearing 61 for the left hand end of the screw 42. The bearing is threaded to the left end of the frame 40 by a coarse thread extending a portion only of its length. The screw is swiveled to the bearing as shown in Fig. 7 so as to be moved laterally thereby but not to be rotated. To the outer end of the member 61 is splined an operating pulley 62 fixed in position and connected by means of cords 63 to an operating lever 64 adapted to be latched in adjusted positions. The opposite end of screw 42 is slidably journaled in frame 40 as shown in Fig. 8. This is the means of hand control and adjustment of the automatic means.

It will be observed that the frame 40 mounted in the frame 41, together with the screw shafts 42 and 61 constitute in combination a three point differential connection to the pendulum standard 35. Through this mechanism it is possible that the pendulum may be differentially and simultaneously acted upon by each of three devices to wit: the follow up device 49, 50, 53, 13 connected with the shaft 42, second, the steering gear connection to frame 40, and third, the manual control connection to the shaft 61. The pendulum of course partakes of the resultant movement of the three actions, of any two of the three, or from any one. Any other known form of differential connection may be substituted for that shown, the principal requisite being that the pendulum must be so connected to the differential as to partake of a movement the resultant of the several component movements from the several points.

Two escapement pawls 65 and 66 engage one each disk 27, 28, and are disposed in opposite directions, having their rear ends normally locking the disks, being biased thereto by springs 67. The rear ends of these escapement pawls are extended into the paths of movement of abutments 68 on the rods 23, 23'. By this means either escapement may be operated to release the corresponding disk 27 or 28 one tooth at a time. This is the locking means. These pawls 65 and 66 are vertically movable, being carried on the end of link 69 connected to lever 70 pivoted to fixed support 71 and operable by cord 72 or other means. This cord extends to a hand control 73 pivoted on a fixed support 74. In the path of cord 72 are two adjacent bell crank levers 75 and 76 adjacent the face of the controlling member 34. Their inner ends are correspondingly slotted and embrace a pin 77 on the controlling member. Their outer ends are attached to branches 78 and 79 from the cord 72. When the cord is pulled the escapement pawls 65 and 66 are disengaged from the disks, and the controlling member is moved by levers 75 and 76 to mid-position in which pawls 29, 29' do not engage, and is held there. This mechanism is the releasing means. With this understanding of the structural features of the invention its operation will be clear.

Let us consider first the operation of the mechanism to restore the balance of a craft upon a list to one side due to any cause. We will assume the list is to the left, the operation on right and left lists being the same.

Fig. 2 shows the parts in their relative positions, immediately the list takes place, and before the balancing mechanism has acted. It will be observed that the line 10 representing the central transverse line of the craft and all the parts are listed to left together. But the pendulum has moved from its normal position over the center line C—C being biased downwardly and to the left of the line C—C by gravity. It has moved the controlling member 34 therefore to the right, and the left hand power pawl 29 engages disk 27. The next instant the pawl which is being constantly reciprocated by the eccentric 21, has moved the disk 27 and the operating drum one point and the balancing planes 11 and 11' have been moved to correct the unbalancing. And the movement continues until the craft responds and partially recovers its normal position, when the movement forward in this direction is stopped automatically. This condition is shown in Fig. 3. At every forward movement in this direction of the planes 11 11' by the operating means, the pivot block 37 is shifted to the left with respect to the controlling member 34, by reason of the action of the follow-up device. Through the gearing 51, 52, 53, 54, 50, 49, 48, 47 the screw 42 is rotated in the frame 40 in a direction to accomplish this. This brings the pendulum to the vertical position again while the craft is still unbalanced, the placing of the standard in the vertical position being due to the combined action of the follow up movement and the return movement of the craft. And this vertical position shown in Fig. 3 is reached, by reason of the movement of the pivot to left by the follow-up device, before the craft has wholly recovered its balance. Thereupon the pendulum disengages the pawl 29, moving the controlling member 34 back to mid-position as shown. Response continuing the pendulum is carried to the right of the vertical and the controlling member 34 is moved to the left to engage the right hand pawl 29'.

Fig. 4 shows this condition. The craft has almost recovered its balance, and the balancing planes are being operated rapidly backward from maximum forward position to normal, and when the craft has reached its normal position of Fig. 1, they likewise will be at normal, the follow-up device having operated this time to move the pivot back to normal. Thus overrunning and oscillating are effectually prevented and the corrective influence of the balancing planes is made approximately proportional to the degree of unbalancing. It is to be noted that the greater the unbalancing the greater the deflection of the balancing planes, to correct, and the more stubborn the craft to respond, also the greater the deflection of the balancing planes.

Consider next the operation of the mechanism in making a turn to right or left. Assume a turn to the left. It is necessary in order to prevent lateral skidding that the craft have a list to the left of a degree depending upon the sharpness of the turn and the speed of the craft. The lateral steering rudder is shifted to the left as usual by turning the post 16 from its normal position. By reason of the connection between the frame 40 and the steering gear, the frame and hence the pivot of the pendulum is shifted bodily to the left, the positional relation between the standard and the controlling member 34 and craft being thus changed. What follows is shown in Fig. 5.

The steering lever 15 has been turned from its normal position of Fig. 1. During the initial part of this movement and before the vertical rudder has been moved (by virtue of the lost motion connection) the frame 40 has been moved to left. The controlling member 34 has moved to left, thus engaging the pawl 29' with the ratchet 28, and the balancing planes have been moved in the direction of the positions shown, and the craft has been given a list to the left. It is to be noted that the direction of movement of the planes under these conditions is the reverse of movement to correct a list to the left. As the movement of the balancing planes is taking place, the follow-up device is moving the pivot to the right, (also the reverse of the initial movement to correct), tending to move the controlling member 34 back to initial position, as before. This movement continues until the craft has listed over far enough to bring the pendulum to vertical position, when the controlling member is moved to the left and the pawl 29' disengaged. The balancing planes are still deflected, however, as in the case illustrated in Fig. 3, being held locked by the escapement pawls, 65 and 66. The listing therefore continues, and immediately the controlling member 34 is thrown to the right, similarly to the shifting of Fig. 4, whereupon the planes 11, 11' are moved step by step back to normal and the listing ceases as they reach normal, the follow-up device having moved the pivot 36 back, and the pendulum once more being vertical. This is shown in Fig. 6, and the craft will be thus maintained listed at a definite angle for each defined angle of turn. And this despite disturbing conditions, the craft being automatically balanced at the abnormal angle in the same manner as in normal position.

By virtue of the lost motion connection, the craft is already listed a certain amount before any turning is done, the vertical rudder commencing its movement after the balancing planes. Preferably, I so proportion the gearing connections between the steering gear and the pendulum frame 40 that the pendulum standard is shifted through an angle equal approximately to one half the desired angle of list. The reason for this is that the listing continues both during movement of the balancing planes to maximum position, when the pendulum hangs again vertically, and during the return of the balancing planes to normal.

At any time during turning or speeding straight away the balancing devices may be operated under hand control through the connections (61, 62, 63, 64), the lever 64 being moved to shift the relation of the pendulum standard of position with respect to the controlling member 34. This is especially valuable as a means of adjustment of normal operating positions of the parts, and as a means of supplementing the automatic action under abnormal conditions. The automatic action may be thus supplemented by manual control in going around a curve, or when severe weather conditions are encountered, and at all other times desired.

In case of failure of the source of power, or stoppage of the engine due to any cause, the lock 65, 66 may be removed from the operating means and the controlling means 34 moved to normal position free from the operating means by operating the lever 73, thus raising the pawls 65, 66 and moving the levers 77 and 78 to the dotted line positions shown whereupon the balancing devices may be manually controlled through the gear, 14, 15, 16, 17 as is usual at the present time. In fact the control may be shifted from automatic to manual and back at any time during operation.

A balancing device 80 of the vertical laterally deflectable type shown in my co-pending application S. No. 607,735, is shown in combination with the automatic operating devices. It is mounted on a mast 81 and is operable by cords which pass from an operating lever 82 located on the right hand side of the operator's seat and extending through sheaves 83 on the cross arm 84 and to the balancing device. By this means in stopping, as well as any other time the action of the automatic device may be supplemented by hand control, and hand control may be used upon the disablement of any of the automatic devices. Thus it will be seen that I have attained the objects of my invention and have provided a flexible and efficient control which is adapted to control under all conditions. And the control is so automatic that any one may operate a craft equipped with it. It is to be noted also that it may be used to balance a craft longitudinally and to control its elevation. Thus if a craft be equipped with two of these mechanisms one operating to preserve lateral balance as shown, and the other operating through the elevating planes to preserve longitudinal balance, the only part an operator has to look out for is the lateral steering, and under favorable conditions this may be left to itself by suitably locking it.

Particular attention is directed to the dead beat nature of the pendulum. The controlling device 34 has a relatively small range of movement, there being just sufficient lost motion present to permit of slight oscillation of the pendulum due to gentle rocking of the craft without engagement of the controlling means with the operating means. The movement of the pendulum is damped by dash pots 85 so that the pendulum is free from objectionable vibration. But far more important than this is the fact that by reason of the attachment of the pendulum to the controlling means at its upper end, its range of initial movement is limited. In other words its amplitude of vibration is initially limited. After the initial movement of the craft in one direction or the other lists the pendulum in the opposite direction, the pendulum is biased by gravitational forces to hold the controlling device 34 in engagement with the operating means. The pendulum therefore cannot vibrate freely at any time, and disturbance of the operating device from this source is effectually prevented. If desired the lost motion between the controlling means and the operating means may be entirely eliminated as in certain hydraulic embodiments of my invention, and furthermore this lost motion may be given any desired value depending upon the characteristics of any particular machine. The thrust fore and aft due to inertia is taken up by roller bearing $35^a$—$35^b$.

I have embodied my invention in commercial form, and show the best form now known to me in Figs. 8 to 12 inclusive of the drawings. All of the parts previously described by means of the diagrams of Figs. 1 to 7 are numbered similarly. They are mounted in a frame composed of two T-shaped spaced side members 86, and substantially in the order shown and described in the diagrams. The T-shaped frame members are inverted, the top of the T being at the bottom of the frame. At the top of the frame is mounted the power shaft 18, and at the bottom the link block 40 carrying the pendulum is slidably mounted in a way 87. Between the power shaft and the pendulum is mounted the operating drum 13. The power transmitting pawl rods 23 carried by the controlling frame 25 are arranged straddling the shaft 26 and in position to be moved into engagement with the ratchets 27, 28 mounted on the shaft 26. The follow-up device comprising gearing 47, 48, 49, 50, 53 etc., is arranged substantially as previously described, the gear 49 being splined upon the shaft 42 and fixed in its rotative plane by location in a pocket 87 formed in the right hand end of the base of the frame. Extensions from the inside of this pocket provide a bearing $87^a$ for the transverse shaft 51. On the opposite side of the base of the frame is provided a pocket somewhat similar to pocket 87 for the guidance of pulley 62 splined on shaft 61 and connected with operating cords 63 through which hand control is effected.

In Fig. 7 is shown a detail of the connection of shaft 61 with the screw shaft 42. It is to be noted that the shaft 61 is screw-threaded to the left hand end of the link 44 and that the shaft 42 is rotatably swiveled within the end of the shaft 61. The shaft 42 passes through a clean hole 44 in the right hand end of the link 40. An extension 88 is formed on the main branch of the frame 86 and on which the bell crank levers 75 76 are mounted. These levers engage the elongated pin 77 from the controlling member 25. The operating lever 70 for the block 69 carrying the escapements 65 66, is pivoted at 71 on the frame as shown, and the block 69 is slidably mounted in the body of the frame. The pulleys over which the operating cords 55 connected with the link 40 pass to the rear rudder control, are shown as journaled on the base of the frame inside. The connection of the mechanism with the power shaft 19 is indicated by the pitch circles 20 of the gears. The power shaft 19 may be the engine shaft or any shaft connected to it or otherwise driven continuously.

In order to limit the extent of movement of the balancing devices by the mechanism, and prevent over movement of the same due to any cause, I provide right and left hand stops 89 which extend downwardly from the controlling member, and into the path of movement of the block 37. By this means when the block 37 has been given a certain movement to right and left, it engages one of the stops 89 and moves the controlling member 34 to its off position in which the operating pawls 29 do not engage the operating ratchets 27 28. The maximum deflection of the operating devices is thus limited. Suitable adjusting means in the form of set screws 90 on the ends of the stops 89 are provided for adjusting this maximum deflection to such value as may be desired.

In Fig. 10 is shown a detail of the connection of the operating drum 13 with the operating shaft 26. This connection is made by means of spiral springs 91 fastened at one end to the shaft and at the other end to the drum, and constituting a yielding connection. Transmission of shocks through the connections to the balancing devices is thus prevented. This yielding connection may be placed in some other position if desired the main requirement being that it shall be placed between the operating means 27 28 and the balancing devices 11 11'.

In Fig. 12 I have shown my invention as mounted upon a flying machine. It will be observed that it is neat and compact, and occupies a minimum of space. It is designed to occupy but the space of an ordinary mantel clock, being about 14 inches high by 6 inches deep by 18 inches extreme width, and weigh but 18 or 20 pounds or less, all parts being made of light metal and of strong and durable design.

I have shown in this application what I term the mechanical embodiments of my invention. I have devised hydraulic, compressed air, and electric embodiments, in which the operation of the balancing devices is carried out by substantially the same principles as outlined therein, but through the use of motive liquids, motive fluids and motive electricity respectively. These modifications are to be covered in divisional applications. While I have described this one embodiment of my invention mentioned, herein it is of course obvious that many modifications may be made by those skilled in the art without departing from the generic spirit of my invention. I desire therefore to cover in the annexed claims all such modifications.

What I claim is:

1. In combination with an air craft provided with balancing devices, steering gear for direct manual control of said craft, and an automatic balancing mechanism comprising operating means for the said balancing devices, a source of power for moving said operating means, a standard of position which has a normal relative position with respect to the craft and which controls the movement of said operating means by said source of power, and means connected with said steering gear of the craft for automatically changing the said normal positional relation of the standard whenever the steering gear is operated.

2. In combination with an air craft provided with balancing devices, operating means for the same, a source of power for moving said operating means, a standard of position which has a normal positional relation to the craft, and which is adapted to control the movement of said operating means from said source of power, a lateral steering device for said craft, and means connecting the lateral steering device with the standard, and operating to change the normal positional relation of the standard when the steering device is operated to turn the craft right and left.

3. In combination with an air craft provided with balancing devices, operating means for the balancing devices, a source of power for moving said operating means, a standard of position which has a normal positional relation to said craft, and which controls the movement of said operating means from said source of power, steering gear for the craft, and means for connecting the steering gear with the standard operative upon movement of the steering gear to change the positional relation of the standard proportionally to the movement of the steering gear.

4. A balancing mechanism for aircraft, comprising balancing devices, steering means, a standard of position for controlling the movement of said balancing devices in accordance with the variations of the craft from normal position, and power operated operating mechanism between said steering means and standard of position on the one hand and said balancing device on the other, controlled in its operation jointly by said standard of position and said steering gear.

5. An automatic balancing system for aircraft comprising balancing devices, a vertical steering rudder, an automatic balancing mechanism for operating said balancing devices having a normally free and unrestricted control over said balancing devices, and manually operable steering gear for moving said vertical rudder having a connection with the said balancing mechanism to effect operation of said balancing devices through operation of said mechanism to bank the craft without removing the balancing devices from the control of said balancing mechanism whereby the normal free and unrestricted control of said balancing devices by said mechanism is not impaired.

6. An automatic balancing system for air craft comprising balancing devices, a vertical steering rudder, power operated automatic balancing mechanism automatically operating said balancing devices in response to unbalancing of the craft, manually operable steering gear for operating said vertical rudder, said balancing mechanism having power controlling means automatically governed in its operation by a standard of position, and connections from said manual steering gear to said automatic mechanism adapted automatically to change the normal relation of said standard and power controlling means to cause operation of the balancing devices through the automatic mechanism without affecting the automatic action of the balancing mechanism.

7. An automatic balancing system comprising balancing devices, an automatic balancing mechanism connected to operate the same, a vertical steering rudder control, and a control connection between said rudder control and said automatic mechanism adapted to effect an operation of said balancing devices by said automatic mechanism without interfering with its free automatic operation when the rudder control is operated to effect a change of course of the craft.

8. An automatic balancing system comprising balancing devices, an automatic balancing mechanism for operating the same, comprising operating means for balancing devices, a source of power for moving said operating means, controlling means adapted to control the movement of said operating means from said source of power, a standard of position connected to govern said controlling means in response to unbalancing of the craft, there being a follow-up connection between the said operating means and said controlling means, a vertical steering rudder, an operating device for the same, and a connection between said rudder operating device and said automatic mechanism adapted to effect movement of said balancing devices through said automatic mechanism whenever said rudder is moved.

9. An automatic balancing system comprising balancing devices, an automatic balancing mechanism for operating the same, comprising operating means for balancing devices, a source of power for moving said operating means, controlling means adapted to control the movement of said operating means from said source of power, a standard of position connected to govern said controlling means in response to unbalancing of the craft, there being a follow-up connection between the said operating means and said controlling means, a vertical steering rudder, an operating device for the same, and a connection between said rudder operating device and said automatic mechanism adapted to effect movement of said balancing devices through said automatic mechanism whenever said rudder is moved, and additional hand operated means for effecting automatic operation of the balancing devices at will independently of the aforesaid rudder operating means.

10. An automatic balancing system for aircraft comprising balancing devices, steering means for the craft, an automatic balancing mechanism for operating said balancing devices having a normally free and unrestricted control over said balancing devices, and manually operable steering gear for moving said vertical rudder having a connection with the said balancing mechanism to effect operation of said balancing devices to bank the craft without removing them from the control of said balancing mechanism whereby the normal free and unrestricted control of said balancing devices by said mechanism is not impaired, and additional means manually operable independently of the aforesaid steering gear connected to similarly control the said balancing devices.

11. An automatic balancing system comprising balancing devices, an automatic balancing mechanism for operating the same, comprising operating means for the balancing devices, a source of power for moving said operating means, controlling means adapted to control the movement of said operating means from said source of power, a standard of position connected to govern said controlling means in response to unbalancing of the craft, said standard having a defined normal positional relation, a three point differential connection through which the normal positional relation of said standard may be changed, there being a follow-up connection between one point of said differential and the aforesaid operating means, a vertical steering rudder, operating connections between said vertical steering rudder and the second point of said differential, and manual controlling means connecting with the third point of said differential.

12. An automatic balancing system comprising balancing devices, an automatic balancing mechanism for operating the same, comprising operating means for balancing devices, a source of power for moving said operating means, controlling means adapted to control the movement of said operating means from said source of power, a standard of position connected to govern said controlling means in response to unbalancing of the craft, there being a follow-up connection between the said operating means and said controlling means, a vertical steering rudder, an operating device for the same, and a connection between said rudder operating device and said automatic mechanism adapted to effect movement of said balancing devices through said automatic mechanism whenever said rudder is moved, and limit stops adapted to act through said controlling means to define points of extreme movement of said balancing devices.

13. An automatic balancing system comprising balancing devices, an automatic balancing mechanism for operating the same, comprising operating means for the balancing devices, a source of power for moving said operating means, controlling means adapted to control the movement of said operating means from said source of power, a standard of position connected to govern said controlling means in response to unbalancing of the craft, said standard having a defined normal positional relation, a two point differential connection through which one of said controlling means and standard may be shifted to change the normal positional relation of said standard, there being a follow-up connection between one point of said differential and the aforesaid operating means, a vertical steering rudder, and operating connections between said vertical steering rudder and the second point of said differential.

14. In combination with an air craft provided with balancing devices, operating means for the balancing devices, a source of power for moving said operating means, a standard of position which has a normal positional relation with respect to the craft and which is adapted to control the movement of said operating means from said source of power, steering gear for said craft, means connecting the steering gear with the standard and operative upon the movement of the steering gear to change the positional relation of the standard proportionately to the movement of the steering gear, said connection embracing lost motion means, whereby said standard may be given a certain limited amount of movement independently of said steering gear and without moving the same.

15. In combination with an air craft provided with balancing devices, operating means for the same, a source of power for moving said operating means, a standard of position which has a normal relative position with respect to the craft, and which is adapted to control the movement of said operating means by said source of power, a laterally shiftable frame which carries the standard of position, lateral steering gear for the craft, and means connecting the said steering gear with the said laterally shiftable frame whereby the frame may be shifted as the steering gear is moved.

16. In combination with an air craft provided with balancing devices, operating means provided for operating the balancing devices, a source of power for said operating means, a standard of position which has a normal positional relation with respect to the craft, and which is adapted to control the movement of said operating means from said source of power, steering gear for the craft, and connections of such proportion between the steering gear and the standard of position as to cause a movement of the standard through an angle substantially equal to one-half of the angle of list it is desired to give the craft when making a turn.

17. In combination with an aircraft provided with balancing devices, power devices for operating the same, controlling means for said power devices, a standard of position governing said controlling means, a vertical rudder, operating means therefor, and an operating connection of such proportion between the said vertical rudder on the one hand and said controlling means and standard of position on the other as to cause a movement of the one through a distance substantially proportional to one-half the initial angle of list it is desired to give the craft when making a turn.

18. An air craft, balancing devices, a vertical rudder, an automatic balancing mechanism for operating the balancing devices, manual control means for said vertical rudder, connections from said manual control means to said balancing mechanism to effect operation of the said balancing devices by said mechanism when the vertical rudder is moved and additional manual control means for the automatic mechanism remote from said mechanism and separate from the first named manual control means whereby the balancing devices may be manually controlled through the automatic mechanism from either manual control without interfering with the automatic action of the same.

19. In an air craft, balancing devices, a vertical rudder, an automatic balancing mechanism for operating the balancing devices, manual control means for said vertical rudder, manual control means for the automatic balancing mechanism remote from said mechanism and separate from the first named manual control means, together with a direct manual control for operating said balancing devices independently of said mechanism.

20. In an air craft, automatically acting means for balancing the same about a longitudinal axis, a vertical rudder and means for operating the same to steer the craft right and left, and a connection between said vertical rudder and said automatic balancing means for modifying the operation of said automatic means to cause the automatic balancing means by its operation to bank the craft, together with manually operable means to balance the craft independently of said automatic means.

21. In combination with an air craft provided with balancing devices, operating means for moving the balancing devices, a source of power for moving said operating means, a standard of position, controlling means adapted to be operated from said standard to cause movement of said operating means from said source of power upon unbalancing of the craft, said standard having a normal positional relation with respect to said controlling means, steering mechanism, means whereby the said positional relation may be changed at will through the steering mechanism, and additional hand operated means for adjusting said positional relation at will.

22. In combination with an air craft, of balancing devices therefor which are normally locked in the positions to which they are moved, operating means for moving the balancing devices, a source of power for moving said operating means, a standard of position adapted to automatically cause movement of said operating means from said source of power upon unbalancing of the craft, manual controlling means, and means for releasing the balancing devices from their locked positions at will, whereby manual control may be exercised.

23. A balancing system comprising balancing devices, manually operable means for controlling the same, automatic means for controlling the same, means for shifting said balancing devices from automatic to manual control at will, and locking means, connected operatively with the aforesaid shifting means and acting when the aforesaid shift is made to lock said automatic means against movement.

24. A balancing system comprising balancing devices, manually operable means for controlling the same, automatic means for controlling the same comprising as a principal controlling element a standard of position, means for shifting said balancing devices from automatic to manual control at will, and locking means for said standard of position connected operatively with the aforesaid shifting means and operated when the aforesaid shift is made to lock the standard of position against movement.

25. A balancing system comprising balancing devices, automatic operating mechanism for normally operating the same, normally inoperative manual means for controlling the same, and duplex shifting control means including devices acting simultaneously to disable the automatic mechanism and enable the manual control means, and vice versa.

26. A balancing system comprising balancing devices, power operated automatic means arranged to normally control the same, normally inoperative manual means for controlling the same, and duplex shifting control means including devices acting simultaneously to render the manual means operative, and vice versa at will, and a shifting device arranged to cut off the power from said automatic control means in the course of shifting from automatic to manual control.

27. A balancing system comprising balancing devices, manual control means for the same, automatic control means for the same comprising operating means for the balancing devices, a source of power, a power controlling device, a standard of position acting to effect the application of power to said operating means upon unbalancing of the craft, shifting means for shifting the control from automatic to manual at will, and means connecting said shifting means with said power controlling device whereby upon shift from automatic to manual control the said power control means is moved to "off" position.

28. An automatic balancing mechanism arranged to operate the balancing devices and to hold the same in any position to which they are operated, and means for releasing said balancing devices from operative control of said mechanism at will and also unlocking the said mechanism.

29. In combination with balancing devices, automatic balancing mechanism therefor including within itself means to hold the operated balancing devices fixedly locked against movement initiated independently of the mechanism in any position to which they may be operated, externally operable means connected with said mechanism to destroy said locking function at will, and manual operating connections extending to the balancing devices through said automatic mechanism.

30. In combination with an air craft provided with balancing devices, operating means for the balancing devices, a source of power for moving said operating means, a standard of position which has a normal positional relation with respect to the craft and which is adapted to automatically control the movement of said operating means from said source of power upon unbalancing of the craft, means for preventing over correction of unbalancing, steering mechanism, means operable through the steering mechanism to change the normal positional relation of the standard at will, manual controlling means for the balancing devices, and means for shifting from automatic to manual control at will.

31. In an aircraft in combination, balancing devices, an automatic means connected to operate said balancing devices and constructed for a total range of operative movement greater than that necessary to move the balancing devices to their positions of maximum effectiveness, and means dependent for its operation upon movement of the automatic means through a predetermined range to limit the operation of the balancing devices to said predetermined range.

32. In an automatic balancing mechanism for air craft comprising a source of power, an operating means for the balancing devices, controlling means by which the transmission of power to the operating means may be controlled, a standard of position controlling the application of power to said operating means through said controlling means, and there being a follow-up connection between the operating means and the controlling means and in addition adjustable limiting means defining the extent of movement of said operating means by the foregoing mechanism.

33. An automatic balancing mechanism comprising, a power driven operating device, controlling means for the same, a standard of position governing said controlling means, and a follow-up device between said operating device on the one hand and said controlling means and standard on the other, together with a limit stop device acting through said controlling means and standard to define the positions of extreme movement of said operating device.

34. In combination an automatic means for operating balancing devices, constructed for a range of movement greater than that necessary to operate the balancing devices to their positions of maximum effectiveness, and a stop device acting upon said automatic means when the same is moved through a predetermined range less than its maximum to stop the same and thereby limit the degree of movement of said balancing devices.

35. In an air craft, balancing devices for the same, an automatic balancing mechanism comprising a source of power, operating means through which the balancing devices may be operated, controlling means for the power applied to said operating means, a standard of position for operation of the said controlling means, a lateral steering gear, connection from said lateral steering gear for changing the normal positional relation between said controlling means and said standard, and a separate hand operated means for manually adjusting said relation at will.

36. An automatic balancing mechanism for aircraft comprising a motor device, a controlling means for said motor device, a standard of position governing said controlling means, and two distinct manually operable means adapted each separately and independently to effect operation of said mechanism without interfering with the governing action of said standard, said manually operable means arranged one to be connected with a suitable manually operable control lever and the other with the steering means of a craft whereby the balancing of the craft may be effected conjunctively with the steering operation or independently thereof through the automatic mechanism and at will.

37. An automatic balancing mechanism for aircraft comprising as its principal and controlling element a standard of position adapted to occupy a predetermined normal position with respect to the craft on which it is mounted, and two distinct manually operable means adapted each separately and independently to effect a shifting of said standard to a new normal position for as long a time as desired, said manually operable means arranged one to be connected with a suitable manually operable control lever and the other with the steering means of a craft whereby the balancing of the craft may be effected conjunctively with the steering operation or independently thereof through the automatic mechanism and at will.

38. An automatic balancing mechanism for aircraft comprising as its principal and controlling element a standard of position adapted to occupy a predetermined normal position with respect to the craft on which it is mounted, manually operable means to effect adjustment of said standard to a new normal position through operation of said mechanism, and additional and independently operable means to effect adjustment of said standard adapted to be connected to the steering device of the craft and whereby banking of a craft may be effected through operation of the said steering mechanism independently of the first named adjusting means.

39. In an air craft, a balancing system comprising balancing devices, an automatic balancing mechanism connected to operate the balancing devices, steering mechanism, means connected therewith to effect operation of the balancing devices to bank the craft without removing them from control of said balancing mechanism, and additional manually operable means to separately and independently effect adjustment of said balancing mechanism to various normal balancing angles.

40. In an air craft, a balancing system comprising balancing devices, an automatic balancing mechanism connected to operate the balancing devices, steering mechanism, means connected therewith to effect operation of the balancing devices to bank the craft without removing them from control of said balancing mechanism, additional manually operable means to separately and independently effect adjustment of said balancing mechanism to various normal balancing angles, and manual control means connected directly with said balancing devices for direct operation of the same.

41. An automatic balancing mechanism for air craft comprising a supporting frame, operating means for the balancing devices, power transmitting means adapted to supply power for movement of said operating means, controlling means for controlling the movement of said operating means by power, a transverse way in said frame, a link slidable in said way, a block slidable on said link, a standard of position pivoted to said block and means gearing the block to said operating means.

42. An automatic balancing mechanism for air craft comprising a supporting frame, operating means for the balancing devices, power transmitting means adapted to supply power for movement of said operating means, controlling means for controlling the movement of said operating means by power, a transverse way in said frame, a link slidable in said way, a block slidable on said link, a standard of position pivoted to said block, means gearing the block to said operating means, and limiting stops between said controlling means and said block.

43. In an air craft, a balancing system comprising transverse balancing devices, automatic balancing means connected to operate said balancing devices, control means to effect operation of said balancing devices to bank the craft, and additional manually operable means to separately and independently effect adjustment of said balancing means to various normal balancing angles.

44. A balancing system for air craft comprising balancing devices, a standard of position connected therewith to govern the movement thereof, rudder surface means to steer the craft right and left, having operating connections with said balancing devices, and arranged to operate the same to bank the craft, and a lost motion device included in said operating connection whereby the craft is banked before said steering means is operated to turn the craft in its course.

45. A balancing mechanism for air craft comprising a motor device, a standard of position arranged to control the operation of said motor device, a follow-up device arranged to coördinate the operating movement of the motor device with the control movement of the said standard position, and adjustable limit devices acting upon the control of said standard of position to limit the degree of operation of said motor device in response thereto.

46. A balancing mechanism for aircraft comprising a motor device, a standard of position having movement relative thereto and through such movement controlling the operation thereof, adjustable limit devices arranged to act upon said standard of position after a predetermined movement of said motor device to limit the same, and a cut off means for said motor device.

47. A balancing mechanism for air craft, comprising a motor device for operating a balancing device, a standard of position arranged to control movement thereof, a follow-up device intermediate said motor device and said standard of position and coördinating the movements thereof, limit devices acting upon the operation of said motor device in response to such control to limit the degree of operation, and a manual control lever controlling said motor device coördinately with said standard of position and arranged to be set to various control positions indicative of the balancing angle it is desired to give the air craft.

48. A balancing mechanism comprising a motor device, a standard of position having a relative control movement with respect thereto and by such movement controlling the operation thereof, a follow-up device intermediate the motor device and said standard of position arranged to coördinate the movements thereof, a manual control lever arranged to control said motor device coördinately with said standard of position and to be placed in various control positions indicative of the balancing angle it is desired to give the craft, a balancing device connected with said motor device, manual operating means therefor, and a cut off device adapted to disable said motor device.

49. A balancing mechanism comprising a motor device, a standard of position having relative control movement and adapted through such movement to control the operation thereof, limit devices affecting the control movement of said standard of position upon movement of the motor device through a determinate range, means for directing the craft right and left, and control connections from such means to the aforesaid mechanism coördinate with the control connection of the said standard of position.

50. A balancing mechanism comprising a motor device, a standard of position having a movement relative thereto and through such movement controlling the operation thereof, a follow-up device intermediate the motor device and standard of position, a lever control device for said motor device controlling the same coördinately with said standard of position and arranged to be set to various positions indicative of the angle of balance it is desired to give the craft, steering means for said craft, and additional control connections for said motor device connected with said steering means and also controlling said motor device coördinately with said standard of position.

51. A balancing mechanism for air craft comprising a motor device, a standard of position having a control movement relative thereto and controlling said motor device by virtue of such movement, a follow-up device coördinating the degree of operation of said motor device with the degree of movement of said standard of position, a manual control lever connected with said motor device and controlling the same coordinately with said standard of position and limit devices arranged to affect the control of such standard of position upon determinate range of operation of said motor device.

52. A balancing mechanism comprising a motor device, a standard of position having control movement relative thereto and through such movement controlling the operation of said motor device, limit devices affecting the control of said standard of position upon operation of said motor device through a determinate range, and means for steering the craft right and left arranged to control said motor device coördinately with said standard of position.

53. A balancing mechanism for aircraft comprising a motor device constructed for a range of movement in excess of normal requirements, a standard of position having relatively controlling movement with respect thereto and through such movement controlling the operation of the motor device, adjustable limit devices effective upon determinate movement of said motor device less than the total range to discontinue the control of said standard of position, and disabling means for said balancing mechanism as a whole.

54. A balancing mechanism for air craft comprising a motor device, a standard of position having relative control movement with respect thereto and through such movement controlling the operation thereof, a follow-up device coördinating the movement of said standard of position and said motor device, a lever connected with the control of the said device and arranged to effect control thereof coördinately with the said standard of position, means to steer the craft right and left, and control connections therefrom to the motor device, also controlling coördinately with the said standard of position.

55. A balancing mechanism for air craft comprising motor device for operating balancing devices, a standard of position having relative control movement with respect thereto and through such control movement controlling said motor device, a follow-up device coördinating the operation of the said motor device with the said movement of the standard of position, a manual control lever arranged to be set to various positions indicative of the balancing angles it is desired to give the craft and means for steering the craft right and left, both said control lever and said steering means having control connections with said motor device arranged to effect control coördinately with said standard of position, and control limit devices becoming effective upon operation of said motor device through a determinate range in a given direction to destroy the coördination between the movement of said standard of position and the operation of said motor device in the same direction.

56. A balancing mechanism for air craft comprising a motor device for operating balancing devices, a standard of position having control movement with respect to said motor device and through such movement controlling the operation thereof, balancing devices connected with said motor device, manual control means for said motor device, releasing mechanism controlling the operative association of said balancing devices with said motor device, and a locking mechanism arranged to lock the sandard of position against control movement, together with transmission mechanism interconnecting said releasing and locking devices for simultaneous operation.

57. A balancing system for air craft, comprising balancing devices therefor arranged in a series train and including manual operating means therefor at one end of the train, a power operated motor device connected with the train intermediate said balancing devices and said manual means and arranged to positively lock the balancing devices in positions to which they are operated, and an unlocking device arranged to release the balancing devices from the locking control of said mechanism whereby the manual control may be exercised freely.

58. A balancing mechanism for air craft comprising a motor device, a standard of position having relative control movement with respect thereto and through such movement controlling the operation of said motor device, balancing devices operated by said motor device, a locking device arranged to positively lock said balancing devices in positions to which they are operated, manual control means for said balancing devices, disabling means for said locking device, and disabling means for said standard, together with transmission connections between said two disabling devices whereby they are simultaneously operated, and manual control may be freely exercised without interference from operation of said motor device.

59. A balancing mechanism for air craft comprising a motor device for operating balancing devices, a standard of position having relative control movement with respect thereto and through said movement controlling the operation thereof, balancing devices operated thereby, said motor device including locking means arranged to retain said balancing devices positively in positions to which they moved, and transmission connections from said locking means to a distant point whereby a remote control of said locking means may be exercised.

60. A balancing mechanism comprising a motor device, a standard of position having a determinate normal disengaged position and a relative control movement through which the operation of said motor device is controlled, and a disengaging device connected with said standard of position and arranged when actuated to operate the same to disengaged position.

61. An automatic balancing mechanism comprising operating means for balancing devices, a source of power for operating said balancing devices, a power controlling device adapted to control the application of power to said operating device and having a substantially unvariable and fixed degree of operative movement, a standard of position connected with said controlling device to inaugurate a corrective movement of the balancing devices upon unbalancing of a craft and having its initial movement limited thereby, and a follow up device between the operating means aforesaid on the one hand and the said controlling means and connected standard of position on the other and operating to give the said standard, a movement variable in degree but proportional to the degree of unbalancing of the craft.

62. An automatic balancing mechanism comprising an operating motor adapted to move the balancing devices back and forth, control means for said motor, a standard of position governing the action of said motor upon the balancing devices in response to changes of position of the craft, a follow up connection between said standard of position and the connection of said motor to said balancing devices and adapted to impart to said standard a relatively large movement upon operation of the balancing devices, and limiting means defining a range of movement for said control means comparatively small as respects the movement of said standard of position by said follow up device.

63. A balancing system comprising balancing devices, normally inoperative manual means for controlling the same, power operated automatic means for controlling the same including a clutch device arranged to couple and uncouple said automatic mechanism with said balancing devices together with separate cut off means for said automatic mechanism connected with said clutch device for operation simultaneously therewith.

64. A balancing system comprising balancing devices, power operated automatic mechanism for controlling the same, a standard of position controlling the application of power to the same, rudder surface means for steering the craft right and left, and a control transmitting connection between said rudder surface means and balancing devices arranged to effect banking of the craft to effect a change of course without interfering with the free operation of the power operated balancing mechanism under the control of said standard of position when the rudder surface is operated.

65. A balancing system comprising balancing devices, automatic means for operating said balancing devices, manual control means for said balancing devices, arranged to actuate said balancing devices independently of operation of said automatic means, rudder surface means for steering the craft right and left, and control transmitting connections between said rudder surface means and balancing devices, arranged to effect operation of the same to bank the craft when the rudder surface means is actuated and operative during control of said balancing devices by the automatic means aforesaid.

66. In an aircraft, a balancing system comprising balancing means for automatically balancing the craft, a steering means arranged to be operated when it is desired to steer the craft right and left, control transmitting connections between said steering and balancing means arranged to effect operation of same in addition to the normal automatic operation thereof to bank the craft, and additional manually operable means having a control transmitting connection with said balancing means coördinate with the transmitting connection from said steering means.

67. A balancing system for aircraft comprising balancing means for automatically balancing the craft, means to steer the craft right and left having operating connections with the balancing means and arranged to operate the same to bank the craft in addition to the normal automatic operation thereof, and a lost motion device included in said operating connection whereby the craft is banked before said steering means is operated to turn the craft in its course.

68. In an aircraft in combination, automatically controlled rudder surface balancing means for automatically balancing the craft and constructed for a maximum range of operative movement, and adjustable limit devices becoming effective upon the movement of the balancing means through a predetermined range less than maximum range to limit the operation thereof.

69. An automatic balancing system comprising balancing devices, normally inoperative manually operable means for controlling the same, a motor device for controlling the same, means to render the manual control operable at will, and cut off means for said motor device together with control transmitting connections between said cut off means and said means for rendering the manual control operative whereby they are simultaneously operated.

70. In an aircraft a balancing system comprising balancing means for automatically balancing the craft, a steering device operated when it is desired to steer the craft right and left, transmitting connections between said balancing means and said steering device effective when the steering gear is operated to bank the craft for a resulting change in its course, and a manual control device for the balancing means independent of said steering device.

71. In an aircraft a balancing system comprising balancing means for automatically balancing the craft, a steering device operated when it is desired to change the course of the craft, control transmitting connections between said steering device and said balancing means, a manual balance controlling lever and control connections therefrom to the balancing means coördinate with the control of said steering device.

72. In an aircraft, a balancing device automatically operated to control the balance of the craft, a control lever connected with said balancing device and arranged to be set at various angles indicating the degree of control exercised, an independent manually operable device for controlling the balancing device having operating connection with said balancing device but normally inoperative, means to render said independent manual control operative, and cut off means for said balancing device, together with operating connections between the two whereby they may be simultaneously actuated.

73. An automatic balancing mechanism comprising an operating device for balancing devices, power transmitting means, a standard of position normally controlling the transmission of power to said operating device, a follow-up device defining the degree of movement of said operating device, said operating device being normally locked into whatever position it has been moved, and means for unlocking at will said operating device.

In testimony whereof I have hereunto set my hand in the presence of two subscribing witnesses.

JOHN P. TARBOX.

Witnesses:
 THOMAS DURANT,
 WM. E. TUCKER.